3,141,122
CIRCUIT ARRANGEMENT FOR MAINTAINING THE TORQUE OF ASYNCHRONOUS MOTORS CONSTANT

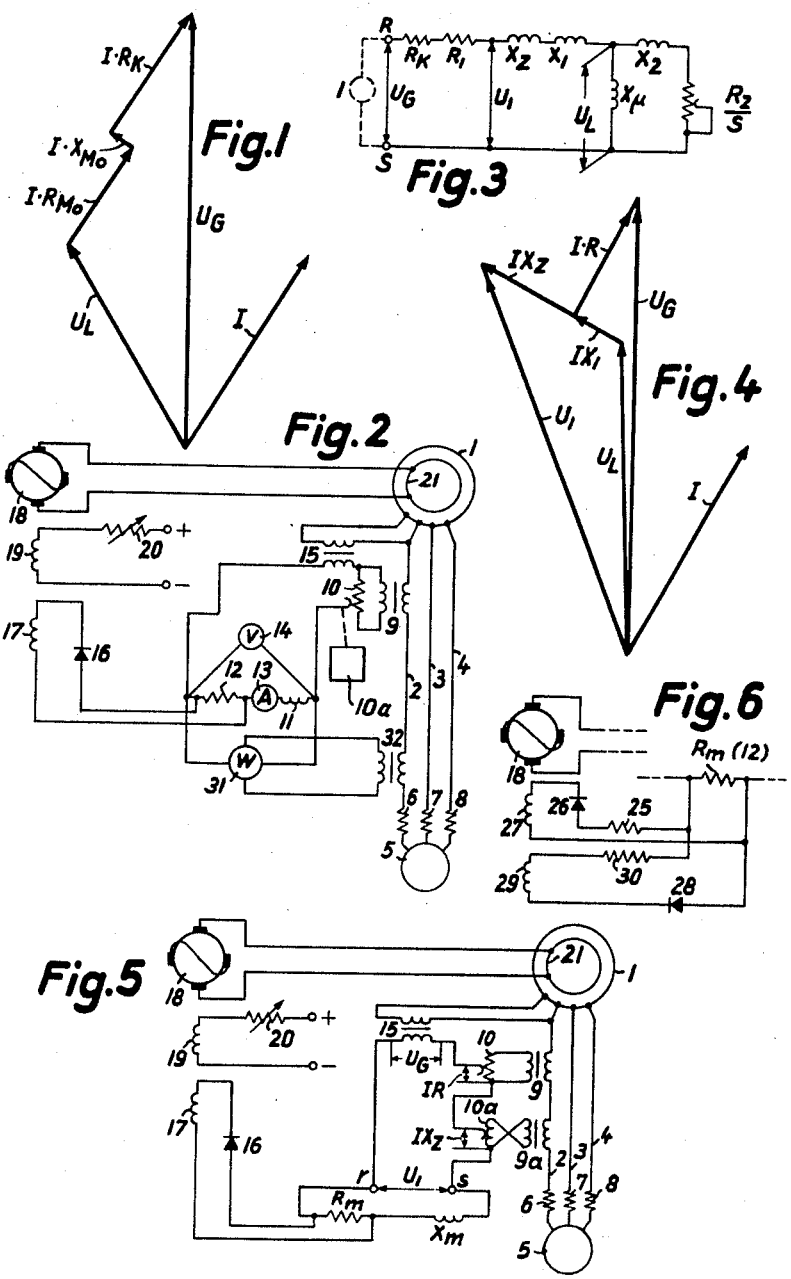

Gerhard Loocke, Berlin-Charlottenburg, Germany, assignor to Allgemeine Elektricitäts-Gesellschaft, Berlin-Grunewald, Germany
Filed Aug. 8, 1960, Ser. No. 48,056
Claims priority, application Germany Aug. 11, 1959
9 Claims. (Cl. 318—148)

In order to suit the demands of the load torque, it is necessary in certain special cases in the field of motor drives to operate an asynchronous motor, particularly a squirrel-cage motor, with variable frequencies. Such case occurs e.g. in the field of rock-drilling technique (oil-drilling technique etc.). Depending upon the strength of the rock to be bored, it is necessary to adjust the speed of the motor driving the drilling-head, with appropriate consideration being given to the advance of the drill.

It is a common practice to install the motor in the drilling gear and to immerse it deeper along with the drilling gear with increasing depth of the drill hole. The drilling head is mounted directly on the rotor shaft. In order to prevent overloading of the motor and consequent interruption of the operation, the break-down torque should remain nearly constant irrespective of the frequency with which the stator is excited. This break-down torque should be adjustable to suit the purpose, as for different sorts of rocks and chisels the parts which mechanically transmit the driving power (shafts, couplings, etc.) could be subjected to strains which exceed the permissible limit and which may lead to the destruction of these parts, in spite of the fact that the motor may not be electrically overloaded. The break-down torque is constant when the magnetic flux in the air gap of the motor is constant. This torque is proportional to the vectorial product of the current and the flux. Inasmuch as the motor is loaded with the maximum permissible current, this flux in the air gap is a measure of the torque.

It is possible to measure the flux in the air gap and to feed this measured value for desired torque as an actual value of the controlled variable to the control system. Inasmuch as it is often difficult to take flux measurements and, in this particular case where the motor may be sunk several thousand meters deep in the drill hole, nearly impossible, use is made of the fact that air gap flux $\phi$ is proportional to the ratio $U_L/f$, where $U_L$ is the imaginary electromotive force across the air gap and $f$ is the frequency with $U_L$ being $$U_L \approx 4.44 \cdot f \cdot w \cdot \phi \cdot 10^{-8}$$

where $w$ is the active number of windings.
From this it follows that $$\phi = C \frac{U_L}{f}$$

where $C$ is a constant.

The value $U_L$ may be termed "imaginary" because it is not possible to measure the electromotive force across the air gap directly. It could be obtained from the vector diagram (FIG. 1) as the vectorial difference between the generator voltage and the voltage drop in the motor circuit. However, the difficulty then arises that the voltage drop becomes greater and greater as result of the increase in length of the feeding conductors along with the increase in depth of the drill hole.

In the vector diagram (FIG. 1) $U_G$ represents the generator voltage which is proportional to the frequency, $U_L$ the electromotive force in the air gap, $I$ the current, $R_{Mo}$ the resistance of the motor windings, $R_K$ the variable resistance of the feeding conductors and $X_{Mo}$ the reactance of the motor windings. From this diagram it will be seen that it is possible to determine $U_L$ with help of one voltage measurement and one current measurement. The measurement is accurate enough, even when the reactance of the motor which becomes smaller with decreasing frequencies is neglected.

As already mentioned above, the problem to be solved is that of creating a controlled variable proportional to the ratio $U_L/f$. This can, for example be achieved in the following way: a series circuit is formed which contains an ohmic resistance and a choke coil whose reactance is large with respect to the above-mentioned resistance, and the voltage $U_L$, or a voltage proportional thereto, is applied across this series circuit. With the ohmic resistance being negligible in comparison to the reactance, the current $i$ flowing through the series circuit is proportional to $U_L/f$ since $$i = \frac{U_L}{\omega L} = \frac{U_L}{2\pi f \cdot L}$$

$\omega$=circuit frequency, $L$=inductance.

Inasmuch as the product $2\pi L$ is constant, $i$ is proportional to the ratio $U_L/f$, and hence proportional to the flux which determines the torque. If this current is made to flow through an ohmic resistance, the voltage drop across this resistance can be fed to a control system as a measure of the flux in the air gap of the motor.

For the drive in question, however there exists as already mentioned the difficulty that the expression $U_L/f$=constant refers to the electromotive force across the air gap of the motor. The voltage measurement at the start of the cable will give a false picture, because as the drill hole becomes deeper, the ohmic resistance of the current supply cable increases. As the drill hole becomes deeper, further cable pieces have to be used. Therefore, due consideration must be given to these circumstances.

The invention deals with a circuit arrangement for maintaining constant the torque of motors connected to a power supply of variable frequencies, particularly the break-down torque of asynchronous motors which are preferably squirrel-cage motors. The invention is characterized by the fact that the value $U_L/f$=constant (where $U_L$=the assumed electromotive force in the air gap and $f$=the frequency), which is derived from the generator voltage and the motor current after appropriate correction for the ohmic and, in some cases, inductive losses of the windings and of the feeding cable, serves as the actual value for the automatic control of the excitation voltage of the generator which feeds the motor.

Additional objects and advantages of the present invention will become apparent upon consideration of the following description when taken in conjunction with the accompanying drawings, in which:

FIGURE 1, referred to above, is a vector diagram showing the relationship between various voltages and currents.

FIGURE 2 is a circuit diagram of one embodiment of the present invention.

FIGURE 3 is an equivalent circuit of the motor.

FIGURE 4 is a vector diagram showing the relationship between various voltages and currents of FIGURE 3.

FIGURE 5 is another embodiment of the present invention.

FIGURE 6 is a fragmentary showing of yet another embodiment of the present invention.

FIG. 2 shows a practical example of the new circuit arrangement. The generator 1 which for example is driven by a diesel motor feeds by means of cables 2, 3 and 4, the motor 5 mounted on the drilling gear below in the drill hole. The ohmic resistance of the winding and that of several thousand meter long cables are designated by 6, 7 and 8. The current transformer 9 is loaded with a load represented as a variable resistance 10. The thus obtained voltage is subtracted from a phase voltage of the generator which is transformed with the help of transformer 15. The transformation ratios and the resistances must be chosen so as to obtain the desired relation $i = U_L/f$. The voltage derived in this way feeds the series circuit consisting of an inductive element 11 and an ohmic element 12, where the value of the inductivity is much higher than the resistance of the circuit. As a control, the current flowing through this circuit can be read in the ammeter 13. Also a voltmeter is provided for measuring the voltage across this series circuit.

As the ohmic and the inductive losses of the motors are practically constant, it is practicable to subdivide the resistance 10 into a constant and a variable part, where the constant part corresponds ot the motor losses. The variable part with which the cable losses are taken care of, is advantageously divided into steps corresponding to the increasing lengths of the feeding cables. The scale plate of the resistance can be calibrated directly in terms of meters of the cable length. If desired the resistance 10 can also automatically be set with the drilling gearing there being suitable means 10a for automatically adjusting the resistance as a function of the depth of the bore hole.

The voltage drop across the resistance 12 is also a measure of the ratio $U_L/f$, as 12 is an ohmic resistance. This voltage is fed over a rectifier 16 to, for example, the winding 17 of a rotary amplifier 18, whose winding 19 is fed by a constant voltage source. The current through the winding 19 can be regulated with the help of the resistance 20. The voltage generated by the rotary amplifier is fed to the excitation circuit 21 of the generator.

The new arrangement also makes it possible to observe the running of the motor by means of the ammeter 13 and the voltmeter 14. Apart from this, it is also useful to provide a wattmeter 31, whose current path is fed from the current transformer 32. The voltage path is fed in the same way as the voltmeter by means of the voltage which is supplied through the transformer 15 and which is proportional to the phase voltage. The deflection of the wattmeter corresponds to the motor torque.

It should be noted that it is possible to design the circuit in such a way that the inductive losses also are taken care of. However, this will generally not be necessary.

The arrangement described above works satisfactorily in many cases. However, there exists a danger that the breakdown torque may be set at a value which is higher than is permissible from point of view of the mechanical strength of the elements involved in the power transmission.

As a further extension of the invention, the break-down torque of the asynchronous motors, preferably squirrel cage motors, which are fed by a synchronous generator delivering a voltage of variable frequencies, is maintained constant in the following manner. The actual value which is used to control the excitation voltage of the generator feeding the motor is a voltage which is also taken from an ohmic resistance connected in series with an inductance that is large in comparison to the ohmic resistance. This series circuit is fed by a voltage which is derived from the transformed phase voltage from which is subtracted the ohmic voltage drop proportional to the current and to which is added an inductive voltage drop proportional to the motor current.

The above will be explained with reference to FIGURES 3 to 5, of which

FIGURE 3 shows the equivalent circuit of the motor, FIG. 4 a vector diagram, and FIGURE 5 an example of the circuit arrangement itself.

In FIG. 3 there is shown a generator 1 which supplies to the terminals R and S the voltage $U_G$ of variable frequencies. The ohmic resistance $R_K$ corresponds to the resistance of the cable which becomes bigger, in case of the motor sunk in a drill hole, the deeper the drill hole becomes, i.e., this resistance is not constant. $R_1$ represents the stator resistance, $X_1$ the primary leakage reactance, $X_2$ the secondary leakage reactance, $X_u$ the magnetizing reactance (air gap reactance), $\dfrac{R_2}{s}$ the quotient $\dfrac{\text{armature resistance}}{\text{slip}}$ An imaginary inductance $X_z$, the significance of which is explained below, is shown between $R_1$ and $X_1$ The air gap voltage $U_L$ is applied to the magnetizing reactance $X_u$. The imaginary voltage $U_1$ is applied between $R_1$ and $X_z$ on one side and the conductor leading to the terminal S on the other side. This imaginary voltage $U_1$ is a measure of the break-down torque. By altering the inductance $X_z$, the break-down torque can be altered. However the controlling arrangement makes certain that the pre-arranged break-down torque remains constant for the particular work cycle. In this connection, it will be noted that $X_z$ does not actually exist but is simulated by a current dependent voltage which is displaced by 90° relative to the current in the sense of an inductive voltage drop.

The vector diagram (FIG. 4) explains the creation of the imaginary voltage $U_1$. The generator voltage is represented by $U_G$, the air gap voltage by $U_L$, the current by I, the inductive voltage drop in the leakage reactance $X_1$, which is at right angles to the current I, by $I \cdot X_1$, and the total ohmic voltage drop with by $I \cdot R$. The voltage $U_1$ which serves as the actual value for the automatic control is derived in such a way, as is seen from the diagram, that the ohmic voltage drop $I \cdot R$ is subtracted from the generator voltage. The inductive voltage drop $I \cdot X_z$ on the imaginary reactance $X_z$ is added to this. It can be proved that this voltage $U_1$ is a measure of the breakdown torque. This additional imaginary reactance is best derived from a current transformer lying in the motor-current circuit, this transformer being connected to an inductive load which can be varied in order to adjust the break-down torque as desired.

FIG. 5 shows a practical example of the new circuit arrangement. The generator 1, which, for example, is driven by a diesel motor whose speed can be regulated, feeds by means of cables 2, 3 and 4, the motor 5 arranged below in the drilling gear. The ohmic resistances of the winding and of several thousand meter long cables are designated 6, 7 and 8. The current transformer 9 is connected to a load represented as a variable resistance. The current transformer 9a is also adjustable and is connected to an inductive load 10a. The crossing of the conductors signifies that the voltage across the load 10 is subtracted from $U_G$ and that the voltage across the load 10a is added to $U_G$. The transformer 15 transforms the phase voltage of the generator G in the circuit which also contains loads 10 and 10a. The voltage $U_L$, which serves as the actual value for the automatic control, is thus formed. As can be seen from the vector diagram, this voltage consists of the transformed generator voltage $U_G$, the voltage drop $I \cdot R$ across the load 10 and the voltage drop $I \cdot X_z$ across the load 10a.

The resistance 10 can be subdivided into a constant and a variable part, as the ohmic losses of the motors are practically constant. The constant part corresponds to these losses. The variable part takes care of the resistance of the feeding cables, which resistance increases with the increase in the cable length.

The voltage $U_1$ is now applied to the series circuit consisting of an inductance $X_m$ and $R_m$, where the reactance of the inductance $X_m$ is greater than the resistance $R_m$. The voltage drop across the resistance $R_m$ is a measure of the quotient $U_1/f$. The presence of the large inductive reactance $X_m$ makes the voltage drop across the resistance $R_m$ independent of the frequency, so that in practice the breakdown torque, once adjusted, remains unchanged, irrespective of the frequencies supplied by the generator.

The actual value across the resistance $R_m$ is again as in the circuit according to FIG. 2, fed over a rectifier 16, to the winding 17 of a rotary amplifier 18 whose winding 19 is fed by a constant voltage. The current through the winding 19 can be adjusted by means of resistance 20. The voltage generated by the rotary amplifier is fed to the excitation circuit of the generator.

As it may prove difficult to provide an appropriate current source for building up the desired value of the controlled variable, the arrangement can be so designed, in a well known manner, that the automatic control is carried out by the automatic adjustment of the desired value of the controlled variable. Such a circuit, which is illustrated in FIG. 6, is particularly important for installations of the types described, inasmuch as an independent current source is rarely available in oil fields.

The actual value is, as in FIG. 5, derived as a voltage across the resistance $R_m$, which lies in the secondary circuits of the current transformers 9 and 9a of FIG. 5. This voltage is applied by way of a resistance 25 and a rectifier 26 to the excitation winding 27, and by way of a non-linear resistance 30 to the excitation coil 29. A rectifier 28 is also provided in this circuit. As a result of the different characteristics of these two circuit parts, an apparent or quasi self-formed desired value of controlled variable is set. The same arrangement could also be used for the illustration according to FIG. 2.

In the illustrations, a rotary amplifier is provided in the control system. In place of this rotary amplifier, a magnetic or electronic amplifier could, of course, also be used.

I claim:

1. A control arrangement comprising, in combination: an asynchronous motor; a synchronous generator for feeding a voltage of variable frequency to said motor, said generator having an excitation circuit which controls the output voltage of said generator; and a circuit for forming the ratio $U_L/f$ ($U_L$=the voltage drop across the air gap of said motor, and $f$=frequency) and maintaining said ratio and thereby the break-down torque of said motor constant, said circuit including a series-circuit incorporating an ohmic resistance and an inductance which is large in comparison with said ohmic resistance, first means for applying to said series-circuit a voltage composed of a transformed phase voltage of said generator and an ohmic voltage drop which is proportional to the motor current and which is subtracted from said phase voltage, and second means for applying to said excitation circuit of said generator a voltage which is a function of the voltage across said ohmic resistance.

2. The combination defined in claim 1 wherein said generator and said motor are connected to each other by a cable, and wherein said first means comprise a current transformer in circuit with said cable for deriving therefrom said ohmic voltage drop proportional to the motor current, the output of said current transformer being connected to a resistance corresponding to the ohmic resistance of said motor, said resistance being variable for allowing adjustment thereof to correspond to different cable lengths.

3. For use in a bore hole drilling operation, the combination defined in claim 2 wherein said generator is located at the top of said bore hole, wherein said motor is located at the bottom of said bore hole, and wherein said variable resistance comprises a scale calibrated as a function of the depth of said bore hole.

4. For use in a bore hole drilling operation, the combination defined in claim 2 wherein said generator is located at the top of said bore hole, wherein said motor is located at the bottom of said bore hole, and wherein means are provided for automatically adjusting said resistance as a function of the depth of said bore hole.

5. The combination defined in claim 1 further comprising third means for applying to said excitation circuit a predetermined desired value, this value being set by an adjustable source of constant voltage.

6. The combination defined in claim 5 wherein said second and third means are combined with each other to form a common means.

7. A control arrangement comprising, in combination an asynchronous motor; a synchronous generator for feeding a voltage of variable frequency to said motor, said generator having an excitation circuit which controls the output voltage of said generator; and a circuit for forming the ratio $U_L/f$ ($U_L$=the voltage drop across the air gap of said motor, and $f$=frequency) and maintaining said ratio and thereby the break-down torque of said motor constant, said circuit including a series-circuit incorporating an ohmic resistance and an inductance which is large in comparison with said ohmic resistance, first means for applying to said series-circuit a voltage composed of a transformed phase voltage of said generator, an ohmic voltage drop which is proportional to the motor current and which is subtracted from said phase voltage, and an inductive voltage drop which is proportional to the motor current and which is added to said phase voltage, and second means for applying to said excitation circuit of said generator a voltage wihch is a function of the voltage across said ohmic resistance.

8. The combination defined in claim 7 wherein said generator and said motor are connected to each other by a cable, and wherein said first means comprise a current transformer in circuit with said cable for deriving therefrom said inductive voltage drop proportional to the motor current.

9. The combination defined in claim 8 wherein the output of said current transformer is connected to an adjustable inductance.

References Cited in the file of this patent
UNITED STATES PATENTS

| | | |
|---|---|---|
| 1,740,332 | Champlin | Dec. 17, 1929 |
| 2,146,778 | Swanson | Feb. 14, 1939 |
| 2,357,087 | Alexanderson | Aug. 29, 1944 |
| 2,381,313 | Schaelchlin et al. | Aug. 7, 1945 |
| 2,431,252 | Hornbarger | Nov. 18, 1947 |
| 2,498,057 | Winther | Feb. 21, 1950 |
| 2,748,340 | Brunner et al. | May 29, 1956 |
| 2,754,464 | Wizenez et al. | July 10, 1956 |
| 2,887,641 | Scharstein et al. | May 19, 1959 |
| 2,961,597 | Carleton | Nov. 22, 1960 |
| 3,026,461 | Lee | Mar. 20, 1962 |